United States Patent
Nakamura et al.

(10) Patent No.: US 8,512,423 B2
(45) Date of Patent: Aug. 20, 2013

(54) METHOD FOR PRODUCING SOLID ELECTROLYTIC CAPACITOR

(75) Inventors: Hidenori Nakamura, Tokyo (JP); Yoshinori Shibuya, Tokyo (JP)

(73) Assignee: Showa Denko K.K., Tokyo (JP)

( * ) Notice: Subject to any disclaimer, the term of this patent is extended or adjusted under 35 U.S.C. 154(b) by 6 days.

(21) Appl. No.: 13/387,859

(22) PCT Filed: Jul. 29, 2010

(86) PCT No.: PCT/JP2010/004805
§ 371 (c)(1),
(2), (4) Date: Feb. 16, 2012

(87) PCT Pub. No.: WO2011/013375
PCT Pub. Date: Feb. 3, 2011

(65) Prior Publication Data
US 2012/0137482 A1   Jun. 7, 2012

(30) Foreign Application Priority Data

Jul. 29, 2009   (JP) .................................. 2009-176166

(51) Int. Cl.
*H01G 9/00*   (2006.01)
(52) U.S. Cl.
USPC ....................................................... 29/25.03
(58) Field of Classification Search
None
See application file for complete search history.

(56) References Cited

U.S. PATENT DOCUMENTS

2004/0233614 A1   11/2004   Naito et al.

FOREIGN PATENT DOCUMENTS

| JP | 07-220982 A | 8/1995 |
| JP | 07-235455 A | 9/1995 |
| JP | 2002-198266 A | 7/2002 |
| JP | 2002-246273 A | 8/2002 |
| JP | 2005-057057 A | 3/2005 |
| JP | 2005-325380 A | 11/2005 |
| WO | WO 2004/068517 A1 | 8/2004 |
| WO | WO 2007/020969 A1 | 2/2007 |

OTHER PUBLICATIONS

International Search Report of PCT/JP2010/004805, dated Oct. 26, 2010.

*Primary Examiner* — Scott B Geyer
(74) *Attorney, Agent, or Firm* — Sughrue Mion, PLLC

(57) ABSTRACT

A surface layer of an anode body containing niobium is converted into a dielectric layer by a method for a chemical formation, which comprises step I of electrolytically forming an anode body comprising niobium in a chemical forming solution containing nitric acid and phosphoric acid at a temperature within a range from 40° C. to a boiling point of the chemical forming solution, step II of heat-treating the electrolytically formed anode body at a temperature within a range from 150° C. to 300° C., and step III of electrolytically forming the heat-treated anode body in a chemical forming solution containing nitric acid and phosphoric acid at a temperature within a range from 40° C. to a boiling point of the chemical forming solution. A cathode is formed on the dielectric layer to obtain a solid electrolytic capacitor element, and the element is sheathed to obtain a solid electrolytic capacitor.

8 Claims, No Drawings

METHOD FOR PRODUCING SOLID ELECTROLYTIC CAPACITOR

CROSS REFERENCE TO RELATED APPLICATION

This application is a National Stage of International Application No. PCT/JP2010/004805 filed Jul. 29, 2010, claiming priority based on Japanese Patent Application No. 2009-176166, filed Jul. 29, 2009, the contents of all of which are incorporated herein by reference in their entirety.

TECHNICAL FIELD

The present invention relates to a method for a chemical formation of an anode body for a solid electrolytic capacitor, a method for producing a solid electrolytic capacitor element and a method for producing a solid electrolytic capacitor. More particularly, the present invention relates to a method for a chemical formation of an anode body for a solid electrolytic capacitor, which can increase stability of a dielectric layer formed on a surface of an niobium anode body and also can remarkably decrease leakage current, and a method which can produce a solid electrolytic capacitor element having high reliability, and a method which can produce a solid electrolytic capacitor with a high yield.

BACKGROUND ART

A solid electrolytic capacitor is a capacitor in which an anode body comprising metal having a valve action or the like is subjected to a chemical formation to form an oxide in a surface layer of the anode body and the surface layer is utilized as a dielectric layer. Tantalum or aluminum is often used in an anode body of a commercially available solid electrolytic capacitor. An aluminum electrolytic capacitor is suited for smoothing a power supply circuit, a time constant circuit and the like since a large capacity is obtained. A tantalum electrolytic capacitor is a miniature electrolytic capacitor and is excellent in characteristics as compared with the aluminum electrolytic capacitor. In particular, the tantalum electrolytic capacitor is often used in an analog circuit. It is also used in a digital circuit for the purpose of removing a spike-shaped current.

Niobium metal is known as metal having physical or chemical properties which are similar to those of tantalum metal. Since reserves of niobium are larger than those of tantalum, stabilization of supply and cost reduction of an electrolytic capacitor can be expected of niobium. There is a possibility that the capacity of the niobium electrolytic capacitor becomes larger than that of the tantalum electrolytic capacitor. Therefore, it is expected that the tantalum electrolytic capacitor will be replaced by the niobium electrolytic capacitor in the future.

However, when electrolytic formation of the anode body comprising niobium was carried out under chemical formation conditions similar to those in case of aluminum or tantalum, satisfactory characteristics could not be obtained. In other words, a niobium oxide film obtained by chemically forming an anode body made of niobium was unstable as compared with a tantalum oxide film. In particular, the niobium oxide is two times the tantalum oxide in a formed film thickness per a chemical formation voltage, and also the niobium oxide is two times the tantalum oxide in strain generated with the growth of the film. Therefore, the withstand voltage on the basis of the film thickness of the niobium oxide film was half that of the tantalum oxide film. In niobium oxide, a non-stoichiometric lower oxide, which does not exist in tantalum oxide, exists. It is considered that this non-stoichiometric lower oxide promotes diffusion of oxygen in a dielectric layer and imparts semiconductive properties to the dielectric layer, and thus causing an increase in the leakage current.

The niobium oxide film has such unstable characteristics. However, there is a possibility that the niobium electrolytic capacitor exhibits performances which are better than those of the tantalum electrolytic capacitor, and thus much more studies have been made.

For example, PLT 1 describes a method for producing an electrolytic capacitor, which comprises electrolytically forming a sintered body made of niobium at a temperature of about 40° C. or lower using, as a chemical forming solution, an aqueous solution containing at least one acid or a salt thereof selected from phosphoric acid, nitric acid, sulfuric acid, adipic acid, boric acid and salts thereof, as a solute.

PLT 2 describes a method for producing an electrolytic capacitor, which comprises electrolytically forming an anode body comprising niobium at a low temperature of about 15° C. using a chemical forming solution acidified by adding an acidifying agent composed of adipic acid to an aqueous solution containing a salt of boric acid or a salt of adipic acid.

PLT 3 describes a method for anodizing niobium for an electrolytic capacitor, which comprises electrolytically chemical forming pellets of metallic niobium in an aqueous phosphoric acid solution adjusted to pH 6 to 11.5, taking out the pellets from the chemical forming solution, immersing the pellets in a mixed solution of phosphoric acid and nitric acid for several minutes to about 10 minutes, subjecting to an annealing treatment comprising heating at a temperature of 250° C. to 800° C. for several minutes to about 10 minutes and slow cooling, and finally subjecting to restorative chemical formation in aqueous phosphoric acid solution adjusted to pH 0 to 5.9.

PLT 4 describes a method for producing a solid electrolytic capacitor, which comprises electrolytically chemical forming an anode body, which is obtained by sintering a valve action metal powder, in an aqueous phosphoric acid solution, and then electrolytically chemical forming it in an aqueous nitric acid solution at a voltage of 60 V or less. However, PLT 4 only discloses, as Examples, that the leakage current could be suppressed when a tantalum sintered body is subjected to a chemical formation.

PLT 5 describes a method for a chemical formation of a valve action metallic material, which comprises steps of chemically forming in an electrolytic solution containing adipate, chemically forming in an electrolytic solution containing at least one selected from the group consisting of oxalic acid, nitric acid, sulfuric acid, adipic acid, phosphoric acid, silicic acid and a salt thereof, heat-treating at a temperature of 250° C. to 400° C., and chemically forming in an electrolytic solution containing adipate in this order. However, PLT 5 only discloses, as Examples, that the leakage current could be suppressed when an aluminum foil is subjected to a chemical formation.

PRIOR ART LITERATURE

Patent Literatures

PLT 1: JP 2002-198266 A
PLT 2: JP 2005-57057 A
PLT 3: JP 2005-325380 A
PLT 4: JP H07-220982 A
PLT 5: WO 2007/020969 A

SUMMARY OF THE INVENTION

Problems to be Resolved by the Invention

However, the solid electrolytic capacitors obtained by the methods for a chemical formation of a niobium anode body described in PLTs 1 to 3 exhibited still low reliability since the leakage current is not sufficiently suppressed. Even if the niobium sintered body is subjected to a chemical formation under the same electrolytic formation conditions as those to the tantalum sintered body described in PLT 4, the obtained niobium oxide film exhibited low stability, and also exhibited still low reliability since the leakage current is not sufficiently suppressed. Stability of the obtained niobium oxide film is slightly improved and the leakage current is lowered by subjecting the niobium sintered body to a chemical formation under the same electrolytic formation conditions as those to an aluminum foil described in PLT 5. However, satisfactory stability is not achieved and a further improvement is required.

An object of the present invention is to provide a method for a chemical formation of an anode body for a solid electrolytic capacitor, which can increase stability of a dielectric layer formed on a surface of an niobium anode body and also can remarkably decrease the leakage current, a method which can produce a solid electrolytic capacitor element having high reliability, and a method which can produce a solid electrolytic capacitor with a high yield.

Means for Solving the Problems

Nitric acid has large conductivity and is known as an electrolyte for an electrolytic forming solution. Nitric acid is also known as an excellent oxidizing agent. However, when electrolytic chemical formation is carried out using nitric acid, nitric acid may be sometimes decomposed by high temperature or high voltage, acting as the oxidizing agent. Therefore, in the electrolytic forming solution using nitric acid, it was difficult to control characteristics of the thus formed oxide film. Since nitric acid also causes a chemical change or an aging variation, it was difficult to industrially use it as an electrolyte for an electrolytic forming solution. Phosphoric acid, which is free from defects like those of nitric acid, is industrially used as an electrolyte for an electrolytic forming solution. However, in electrolytic chemical formation of a niobium anode body using a phosphoric acid-containing chemical forming solution, the obtained niobium oxide film exhibited low stability.

The present inventors have intensively studied so as to achieve the above object and focused on nitric acid and phosphoric acid which have the above-mentioned defects. As a result, they have found that, when a chemical formation method comprising step I of electrolytically forming a niobium anode body in a chemical forming solution containing nitric acid and phosphoric acid at a temperature within a range from 40° C. to a boiling point of the chemical forming solution, step II of heat-treating the electrolytically formed anode body at a temperature within a range from 150° C. to 300° C., and step III of electrolytically forming the heat-treated anode body in a chemical forming solution containing nitric acid and phosphoric acid at a temperature within a range from 40° C. to a boiling point of the chemical forming solution is performed, it becomes possible to carry out a chemical formation even at a high voltage, and thus making it possible to increase stability of the dielectric layer formed on a surface of the niobium anode body and to remarkably decrease the leakage current. The present invention has been completed as a result of a further study based on this finding.

The present invention includes the following aspects.
<1> A method for a chemical formation of an anode body for a solid electrolytic capacitor, which comprises:
  step I of electrolytically forming an anode body comprising niobium in a chemical forming solution containing nitric acid and phosphoric acid at a temperature within a range from 40° C. to a boiling point of the chemical forming solution,
  step II of heat-treating the electrolytically formed anode body at a temperature within a range from 150° C. to 300° C., and
  step III of electrolytically forming the heat-treated anode body in a chemical forming solution containing nitric acid and phosphoric acid at a temperature within a range from 40° C. to a boiling point of the chemical forming solution.
<2> The method for a chemical formation of an anode body for a solid electrolytic capacitor according to <1>, wherein the chemical forming solution has a nitric acid concentration from 0.01% by mass to the saturated concentration.
<3> The method for a chemical formation of an anode body for a solid electrolytic capacitor according to <1> or <2>, wherein the chemical forming solution has a phosphoric acid concentration from 0.1 to 9 times by mass a nitric acid concentration.
<4> The method for a chemical formation of an anode body for a solid electrolytic capacitor according to any one of <1> to <3>, wherein the phosphoric acid is orthophosphoric acid.
<5> The method for a chemical formation of an anode body for a solid electrolytic capacitor according to any one of <1> to <4>, wherein the anode body comprising niobium is a niobium porous sintered body.
<6> A method for producing a solid electrolytic capacitor element, which comprises: converting a surface layer of the anode body comprising niobium into a dielectric layer by the method for a chemical formation according to anyone of <1> to <5>, and forming a cathode on the dielectric layer.
<7> The method for producing a solid electrolytic capacitor element according to <6>, wherein the cathode is composed of a semiconductor layer and a conductor layer.
<8> A method for producing a solid electrolytic capacitor, which comprises sheathing a solid electrolytic capacitor element obtained by the production method according to <6> or <7>.

ADVANTAGEOUS EFFECTS OF THE INVENTION

According to the present invention, in the solid electrolytic capacitor, the leakage current is decreased and thermal stability is improved. Since it is possible to carryout chemical formation at a high voltage, a solid electrolytic capacitor having a high withstand voltage can be obtained. It is considered that such remarkable effects results from formation of a stable oxide film, which is dense and has less defects, on a surface of niobium.

EMBODIMENT FOR CARRYING OUT THE INVENTION

The present invention will be described in more detail below. The anode body used in the present invention comprises niobium. Examples thereof include an anode body made of a niobium metal or a niobium based alloy. The anode body is preferably a niobium porous sintered body. The niobium porous sintered body can be produced, for example, in the following manner. A binder is added to a niobium powder, followed by mixing. The thus obtained mixture is press-formed into a predetermined shape. During press forming, a lead wire (usually using a niobium wire) for an anode is embedded and planted. Then, the thus obtained green compact is fired in high vacuum (usually under $10^{-4}$ Pa or less) at 1,000° C. to 1,400° C. thereby sintering a niobium powder, and the product is finally cooled in vacuum.

[Step I]

In the method for a chemical formation of an anode body for a solid electrolytic capacitor of the present invention, first, the anode body is subjected to electrolytic formation in a chemical forming solution containing nitric acid and phosphoric acid at a temperature within a range from 40° C. to a boiling point of the chemical forming solution (step I). An oxide film is formed by this electrolytic formation.

When nitric acid and phosphoric acid are respectively used alone as an electrolyte of a chemical forming solution, they had the above-mentioned problems. However, it has been found that, when the both nitric acid and phosphoric acid are used as the electrolyte, a convergence value of an electrolytic formation current at the time of constant voltage chemical formation (hereinafter may be sometimes referred to as a "constricted current value") becomes smaller than that of each chemical forming solution and thus the leakage current in a solid electrolytic capacitor remarkably decreases. This reason is not clear, but is estimated that decomposition of nitric acid is suppressed by condensation of phosphoric acid, resulting in offset of an oxidizing action of nitric acid. The phosphoric acid to be added is preferably orthophosphoric acid since it is easy to be industrially utilized.

The chemical forming solution may contain other electrolytes as long as the effects of the present invention are not impaired. Examples of other electrolytes include inorganic acids such as sulfuric acid and boric acid; organic acids such as oxalic acid and adipic acid; and alkali metal salts or ammonium salts thereof. Water is usually used as the solvent of the chemical forming solution. The chemical forming solution may contain oxygen supplying agents such as hydrogen peroxide and ozone as long as the effects of the present invention are not impaired.

There is no particular limitation on the concentration of the electrolyte as long as electrolytic formation can be carried out. When the concentration of the electrolyte is high, electric conductivity tends to increase and thus a chemical formation can be efficiently carried out. To the contrary, when the concentration of the electrolytic solution is low, it tends to become easy to carry out washing after electrolytic formation. The concentration of the electrolyte can be appropriately selected from the above viewpoint. For example, the concentration of nitric acid is preferably from 0.01% by mass to saturated concentration thereof, more preferably from 0.2% by mass to 2% by mass, and still more preferably from 0.2% by mass to 1% by mass. The concentration of phosphoric acid is preferably from 0.1 to 9 times, and more preferably from 0.2 to 4 times, in terms of a mass ratio to nitric acid. When the concentration of phosphoric acid is within the above mass ratio to nitric acid, decomposition of nitric acid is suppressed and thus stability of the niobium oxide film is improved.

Electrolytic formation is carried out at a temperature within a range from 40° C. to a boiling point of the chemical forming solution. When the temperature is lower, the leakage current tends to increase. When the temperature is higher than about 100° C., the electrostatic capacity tends to decrease. From such viewpoint, the temperature at the time of electrolytic formation is preferably from 50° C. to 100° C., more preferably from 70° C. to 90° C., still more preferably from 75° C. to 85° C., and particularly preferably about 80° C.

The voltage and current to be applied at the time of electrolytic formation can be selected according to a target withstand voltage of the obtained solid electrolytic capacitor. The chemical formation current is usually from 0.1 mA/g to 1 A/g. When a powder having an electrostatic capacity (CV product) of 50,000 to 150,000 μFV/g is used, the chemical formation current is preferably from 100 mA/g to 400 mA/g, and particularly preferably about 200 mA/g, from the viewpoint of the electrostatic capacity. It is preferred that the voltage is increased first so that the current value is constant and then maintained at a constant voltage (chemical formation voltage) in electrolytic formation. The chemical formation desirably make an end at the time when the constricted current value is as small as possible, and preferably at the time when the constricted current value is 1/20 or less of an initial current value at the time of initiation of the chemical formation, or after a lapse of several hours from initiation of the chemical formation.

[Step II]

After step I, the electrolytically formed anode body is washed with pure water and then subjected to a heat treatment (step II). This heat treatment enables removal of moisture to give a hard oxide film. The heat treatment also exerts the effect of extracting and removing nitric acid ions remaining in the oxide film. The heat treatment is carried out at a temperature within a range from 150° C. to 300° C., preferably from 200° C. to 290° C., more preferably from 220° C. to 280° C., still more preferably from 240° C. to 260° C., and particularly preferably at about 250° C. When the temperature is too high, damage of the film excessively proceed. When the temperature is too low, removal of nitric acid ions does not proceed. Nitric acid ions remaining in the oxide film may sometimes promote formation of a lower niobium oxide and also may sometimes cause deterioration of insulating properties. There is no particular limitation on the heat treatment time as long as stability of the film can be maintained, and the heat treatment time is preferably from 10 minutes to 2 hours, and more preferably from 20 minutes to 30 minutes.

[Step III]

After step II, the heat-treated anode body is subjected to electrolytic formation in a chemical forming solution containing nitric acid and phosphoric acid at a temperature within a range from 40° C. to a boiling point of the chemical forming solution (step III). The electrolytic formation in step III enables reoxidation of the site which could not be sufficiently oxidized by the electrolytic formation in step I or the lattice defect site formed by extraction of nitric acid ions in step II, and thus a niobium oxide film can be stabilized. The electrolytic formation in step III may be sometimes referred to as restorative chemical formation.

It is possible to exemplify, as the chemical forming solution used in the electrolytic formation as well as temperature, voltage and current at the time of the chemical formation in step III, the same as those described as the chemical forming solution used in the electrolytic formation as well as temperature, voltage and current at the time of the chemical formation in step I. Completion of the chemical formation can be set at the point of time when the constricted current value is stabilized. The electrolytic formation time in step III is usually less than 1 hour, and preferably from 20 minutes to 30 minutes.

The anode body subjected to electrolytic formation in step III is washed with pure water and then dried. There is no particular limitation on drying as long as drying is carried out at the temperature and time which enable vaporization of water adhered to the anode body. However, when the temperature at the time of drying is too high, oxygen in the oxide film is likely to diffuse and an adverse influence may be exerted on electric characteristics. Therefore, drying is preferably carried out, for example, under the conditions that the anode body is maintained at a temperature of 105° C. for 30 minutes.

The solid electrolytic capacitor element of the present invention can be obtained by the production method comprising carrying out the above chemical formation method to convert a surface layer of the anode body comprising niobium into a dielectric layer (i.e., oxide film), and then forming a cathode on the dielectric layer. When the anode body is a porous body, the surface layer of the anode body also includes a surface layer of a pore inner wall. The solid electrolytic capacitor of the present invention can be obtained by the production method comprising sheathing the solid electrolytic capacitor element obtained above.

It is possible to use, as the cathode, those used in a conventional solid electrolytic capacitor without any limitation. The cathode may be composed of a semiconductor layer, or may be composed of a semiconductor layer and a conductor layer. Examples of the semiconductor layer include inorganic semiconductor layers such as a molybdenum dioxide layer, a tungsten dioxide layer, a lead dioxide layer and a manganese dioxide layer; and organic semiconductor layers or conductive polymer layers, such as a tetracyanoquinodimethane (TCNQ) complex salt layer, a polypyrrole layer, a polythiophene layer, a polysulfide layer, a polyfuran layer and a polyaniline layer. The semiconductor layer is preferably an organic semiconductor layer or a conductive polymer layer in view of the fact that the cathode is also easily formed on a dielectric layer formed on even a surface of the pore inner wall when the anode body is a porous body. Examples of the conductor layer include a conductive paste layer formed by applying a conductive carbon paste, a silver paste or the like, or a conductive metal layer which can be formed by metal plating or vapor deposition and the like.

A cathode lead is connected to the above cathode in a state where electricity can be supplied, and the cathode lead is exposed outside of a sheath of a solid electrolytic capacitor to form a cathode external terminal. In contrast, an anode lead is connected to an anode body in a state where electricity can be supplied, and the anode lead is exposed outside of a sheath of a solid electrolytic capacitor to form an anode external terminal. A general lead frame can be used so as to attach the cathode lead and the anode lead. Then, the sheath is formed by sealing using a resin or the like, and thus a solid electrolytic capacitor can be obtained. The solid electrolytic capacitor thus obtained can be optionally subjected to an aging treatment. The solid electrolytic capacitor obtained by the production method of the present invention can be used by mounting on various electric circuits or electronic circuits.

Electric characteristics of the solid electrolytic capacitor element or solid electrolytic capacitor obtained by the production method of the present invention can be quickly evaluated by measuring electric characteristics of the anode body subjected to the chemical formation. In other words, the effects of the present invention can be judged by immersing the anode body subjected to the chemical formation in an aqueous 40% by mass sulfuric acid solution, connecting the anode body as an anode and a platinum black electrode as a cathode to an impedance analyzer and an LC meter, and measuring electric characteristics.

EXAMPLES

The present invention will be described more specifically below by way of Examples and Comparative Examples, but the present invention is not limited by these descriptions.

Example 1

22 mg of a niobium fine powder having a CV product of 130,000 μFV/g was shaped into a cube, while a conducting wire made of niobium was embedded and planted at the center of one surface of the cube. The obtained cubic green compact was fired in a firing furnace evacuated to $10^{-4}$ Pa or less at a temperature of 1210° C. for 30 minutes to obtain a sintered body. An aqueous solution comprising 0.5% by mass of nitric acid and 0.5% by mass of orthophosphoric acid (a mass ratio to nitric acid: 1 time) was prepared and the obtained solution was used as a chemical forming solution.

The chemical forming solution was warmed to 80° C. The sintered body was immersed in the chemical forming solution, and a DC voltage was applied so as to maintain a current of 200 mA/g, using the sintered body as an anode. From the point of time when the applied voltage reached 20 V, the electrolytic formation was carried out for 2 hour so as to maintain a voltage of 20 V. After the electrolytic formation, the sintered body was washed with water and subjected to a heat treatment using a dryer at 250° C. for 20 minutes. After the heat treatment, the sintered body was immersed in a chemical forming solution with the same composition as described above at 80° C. and a DC voltage was applied so as to maintain a current of 200 mA/g, using the sintered body as an anode. From the point of time when the applied voltage reached 20 V, electrolytic formation was carried out for 30 minutes so as to maintain a voltage of 20 V.

The sintered body subjected to the chemical formation (hereinafter sometimes referred to as an element) was washed with water and dried. The sintered body was immersed in an aqueous 40% by mass sulfuric acid solution, and the element as an anode and a platinum black electrode as a cathode were connected to an impedance analyzer and an LC meter, and then the electrostatic capacity (CV value) and the leakage current (LC value) were measured.

Examples 2 to 5 and Comparative Examples 1 to 6

Elements were produced in the same manner as in Example 1, except that the concentrations of nitric acid and phosphoric acid, chemical formation temperature, chemical formation voltage, and heat treatment temperature were changed to those shown in Table 1, and the electrostatic capacity (CV value) and the leakage current (LC value) thereof were measured. The results are shown in Table 1.

TABLE 1

| | First and second chemical formations | | | | | | | |
|---|---|---|---|---|---|---|---|---|
| | Chemical forming solution | | Chemical formation temp. (°C.) | Chemical formation volt. (V) | Heat treatment (°C.) | CV value (μFV/g) | LC value (μA/g) | LC/CV (nA/μFV) |
| | Nitric acid (%) | Phosphoric acid (%) | | | | | | |
| Ex. 1 | 0.5 | 0.5 | 80 | 20 | 250 | 171000 | 18.2 | 0.106 |
| Ex. 2 | 0.25 | 0.75 | 80 | 20 | 250 | 176000 | 20.1 | 0.114 |
| Ex. 3 | 0.75 | 0.25 | 80 | 20 | 250 | 169000 | 15.3 | 0.091 |
| Comp. Ex. 1 | 0.5 | 0.5 | 80 | 20 | 105 | 167000 | 23.4 | 0.140 |
| Comp. Ex. 2 | 0.5 | 0.5 | 30 | 20 | 250 | 230000 | 273.5 | 1.190 |
| Ex. 4 | 0.5 | 0.5 | 80 | 40 | 250 | 133000 | 17.7 | 0.133 |
| Comp. Ex. 3 | 1 | 0 | 80 | 40 | 250 | 130000 | 178.9 | 1.380 |
| Comp. Ex. 4 | 0 | 1 | 80 | 40 | 250 | 146000 | 29.0 | 0.199 |
| Ex. 5 | 0.5 | 0.5 | 80 | 60 | 250 | 124000 | 81.8 | 0.660 |
| Comp. Ex. 5 | 1 | 0 | 80 | 60 | — | Impossible to perform chemical formation | | |
| Comp. Ex. 6 | 0 | 1 | 80 | 60 | 250 | 110000 | 150.8 | 1.370 |

As shown in Table 1, a high chemical formation voltage cannot be achieved by electrolytic formation using an aqueous nitric acid solution (Comparative Example 5), while the leakage current is high when chemical formation is carried out at a low voltage (Comparative Example 3). In electrolytic formation using an aqueous phosphoric acid solution, when the chemical formation voltage increases, the leakage current cannot be suppressed to a low value (Comparative Examples 4 and 6). When only drying is carried out at 105° C. after electrolytic formation (Comparative Example 1) and electrolytic formation is carried out at room temperature of 30° C. (Comparative Example 2), the leakage current is high.

To the contrary, when the anode body containing niobium is subjected to electrolytic formation in a chemical forming solution containing nitric acid and phosphoric acid at a temperature within a range from 40° C. to a boiling point of the chemical forming solution, the anode body subjected to the electrolytic formation is subjected to a heat treatment at a temperature within a range from 150 to 300° C., and then the heat-treated anode body is subjected to electrolytic formation in a chemical forming solution containing nitric acid and phosphoric acid at a temperature within a range from 40° C. to a boiling point of the chemical forming solution, the leakage current can be remarkably decreased (Examples 1 to 5). According to the chemical formation method of the present invention, even if the chemical formation voltage is increased, the leakage current can be suppressed to a low value (Example 5).

The invention claimed is:

1. A method for a chemical formation of an anode body for a solid electrolytic capacitor, which comprises:
   step I of electrolytically forming an anode body comprising niobium in a chemical forming solution containing nitric acid and phosphoric acid at a temperature within a range from 40° C. to a boiling point of the chemical forming solution,
   step II of heat-treating the electrolytically formed anode body at a temperature within a range from 150° C. to 300° C., and
   step III of electrolytically forming the heat-treated anode body in a chemical forming solution containing nitric acid and phosphoric acid at a temperature within a range from 40° C. to a boiling point of the chemical forming solution.

2. The method for a chemical formation of an anode body for a solid electrolytic capacitor according to claim 1, wherein the chemical forming solution has a nitric acid concentration from 0.01% by mass to the saturated concentration.

3. The method for a chemical formation of an anode body for a solid electrolytic capacitor according to claim 1, wherein the chemical forming solution has a phosphoric acid concentration from 0.1 to 9 times by mass a nitric acid concentration.

4. The method for a chemical formation of an anode body for a solid electrolytic capacitor according to claim 1, wherein the phosphoric acid is orthophosphoric acid.

5. The method for a chemical formation of an anode body for a solid electrolytic capacitor according to claim 1, wherein the anode body comprising niobium is a niobium porous sintered body.

6. A method for producing a solid electrolytic capacitor element, which comprises:
   carrying out a method comprising step I of electrolytically forming an anode body comprising niobium in a chemical forming solution containing nitric acid and phosphoric acid at a temperature within a range from 40° C. to a boiling point of the chemical forming solution, step II of heat-treating the electrolytically formed anode body at a temperature within a range from 150° C. to 300° C., and step III of electrolytically forming the heat-treated anode body in a chemical forming solution containing nitric acid and phosphoric acid at a temperature within a range from 40° C. to a boiling point of the chemical forming solution, to convert a surface layer of the anode body comprising niobium into a dielectric layer; and
   forming a cathode on the dielectric layer.

7. The method for producing a solid electrolytic capacitor element according to claim 6, wherein the cathode is composed of a semiconductor layer and a conductor layer.

8. A method for producing a solid electrolytic capacitor, which comprises sheathing a solid electrolytic capacitor element obtained by the production method according to claim 6.

* * * * *